United States Patent
Komuro

[19]

[11] Patent Number: 6,032,594
[45] Date of Patent: Mar. 7, 2000

[54] EMBROIDERABLE SEWING MACHINE, EMBROIDERY DATA PROCESSING APPARATUS, AND DESIGN DATA RECORDING MEDIUM

[75] Inventor: Kyoji Komuro, Nagoya, Japan

[73] Assignee: Brother Kogyo Kabushiki Kaisha, Nagoya, Japan

[21] Appl. No.: 09/120,802

[22] Filed: Jul. 23, 1998

[30] Foreign Application Priority Data

Sep. 30, 1997 [JP] Japan ..................... 9-284322

[51] Int. Cl.[7] .............. D05C 5/02; D05B 21/00; G06F 19/00
[52] U.S. Cl. .................. 112/102.5; 112/475.19; 364/470.09
[58] Field of Search ............. 112/102.5, 470.06, 112/475.19, 445, 456, 458; 364/470.09

[56] References Cited

U.S. PATENT DOCUMENTS 4,960,061  10/1990  Tajima et al. .
5,791,270  8/1998  Mori ..................... 112/102.5
5,803,000  9/1998  Morita ..................... 112/102.5
5,868,088  2/1999  Mori et al. ............ 112/470.04 X
5,874,986  7/1998  Morita ..................... 112/102.5

FOREIGN PATENT DOCUMENTS 62-13474 U   1/1987   Japan .
63-105787    5/1988   Japan .
1-213455     8/1989   Japan .

*Primary Examiner*—Peter Nerbun
*Attorney, Agent, or Firm*—Oliff & Berridge, PLC

[57] ABSTRACT

A sewing machine having an embroidery capability stores embroidery frame outline data and data of a net embroidering area together with design data in a storing medium and displays the embroidery design, the embroidery frame outline, and the net embroidering area on a display screen when editing an embroidery design. The embroidering area enables embroidering without interference between the embroidery frame and a presser foot of the sewing machine. In addition, the configuration of the sewing machine may be such that the net embroidering area is computed from the embroidery frame outline instead of storing the net embroidering area data.

24 Claims, 13 Drawing Sheets

Fig.5

| | |
|---|---|
| | START ADDRESS FOR DESIGN DISPLAY DATA<br>START ADDRESS FOR EMBROIDERY DATA |
| FIRST GROUP | NO.1 EMBROIDERY DESIGN DISPLAY DATA |
| | NO.2 EMBROIDERY DESIGN DISPLAY DATA |
| | NO.3 EMBROIDERY DESIGN DISPLAY DATA |
| | NO.4 EMBROIDERY DESIGN DISPLAY DATA |
| | NO.5 EMBROIDERY DESIGN DISPLAY DATA |
| SECOND GROUP | NO.1 EMBROIDERY DESIGN DISPLAY DATA |
| | NO.2 EMBROIDERY DESIGN DISPLAY DATA |
| | NO.3 EMBROIDERY DESIGN DISPLAY DATA |
| | NO.4 EMBROIDERY DESIGN DISPLAY DATA |
| | NO.5 EMBROIDERY DESIGN DISPLAY DATA |
| FIRST GROUP | NO.1 EMBROIDERY DESIGN EMBROIDERING DATA |
| | NO.2 EMBROIDERY DESIGN EMBROIDERING DATA |
| | NO.3 EMBROIDERY DESIGN EMBROIDERING DATA |
| | NO.4 EMBROIDERY DESIGN EMBROIDERING DATA |
| SECOND GROUP | NO.1 EMBROIDERY DESIGN EMBROIDERING DATA |
| | NO.2 EMBROIDERY DESIGN EMBROIDERING DATA |
| | NO.3 EMBROIDERY DESIGN EMBROIDERING DATA |
| | NO.4 EMBROIDERY DESIGN EMBROIDERING DATA |

Fig.6

| | |
|---|---|
| START ADDRESS FOR EMBROIDERY FRAME OUTLINE DATA | |
| START ADDRESS FOR NET EMBROIDERY AREA DATA | |
| FIRST EMBROIDERY FRAME | EMBROIDERY FRAME OUTLINE DATA |
| | NET EMBROIDERY AREA DATA |
| SECOND EMBROIDERY FRAME | EMBROIDERY FRAME OUTLINE DATA |
| | NET EMBROIDERY AREA DATA |
| THIRD EMBROIDERY FRAME | EMBROIDERY FRAME OUTLINE DATA |
| | NET EMBROIDERY AREA DATA |

EMBROIDERABLE SEWING MACHINE, EMBROIDERY DATA PROCESSING APPARATUS, AND DESIGN DATA RECORDING MEDIUM

BACKGROUND OF THE INVENTION

1. Field of Invention

The invention relates to a sewing machine capable of embroidering, an apparatus for processing embroidery data, and a medium for storing embroidery design data, more particularly to a technology that allows embroidery designs and a net embroidering area to be displayed on a screen, when embroidering a cloth set on an embroidery frame of the sewing machine, by finding the net embroidering area in the embroidery frame, that is, the area in which embroidering can be accomplished. The net embroidering area enables embroidering, as the presser foot used to hold the cloth and the embroidery frame do not interfere with each other.

2. Description of Related Art

There are sewing machines capable of embroidering, such as dedicated embroidering machines, and electronic sewing machines capable of embroidering, that are already in use. An electronic sewing machine capable of embroidering, uses a device respectively for feeding an embroidery cloth independently in each of the X and Y directions. The device is removably attached to the ordinary electronic sewing machine. Each such embroiderable sewing machine is provided with a means for storing data for many embroidery designs (embroidery data and design display data or embroidery data), a display unit, and a display control unit. The design data storing means may be provided in the control unit or provided as a removable ROM card to the control unit. In recent years, an embroidering system composed of plural embroidering machines controlled by a computer has been used. Hereafter, embroidery designs will be referred to simply as designs.

In such an embroidering system, an embroidery design is edited prior to the actual embroidering. In the editing process, the design is displayed on a display screen, together with an embroidery frame pattern as needed. The design is expanded or shrunk on the screen and moved within the embroidery frame. After the editing process, the embroidering begins using the design.

On the other hand, an embroidery cloth is set on the embroidery frame (including an outer frame and an inner frame fit in the outer frame with the object cloth set therebetween). The embroidery frame is driven independently in each of the X and Y directions according to the embroidery data. The embroidering presser foot has an L-shaped portion (side view) extended downward, then forward. A ring-like pressing portion (a needle is passed through this portion) is formed at a stepped-down portion of the L-shaped portion at the tip of the presser foot. Consequently, when the embroidery frame is moved forward and the embroidery frame and the presser foot come closer to each other, the bottom of the L-shaped portion of the presser foot and the rear portion of the inner periphery outline of the embroidery frame interfere each other.

In the case of the automatic embroidering machine disclosed, for example, in Unexamined Published Japanese Patent Application No. 1-213455(U.S. Pat. No. 4,960,061), the machine is composed so that data of a plurality of designs is stored in a design memory and data of the embroidery frame shape is stored in a frame pattern memory in advance. Then, both the design and the embroidery frame pattern are displayed on a display screen while the design is edited. In this case, however, the outline of the embroidery frame is not displayed. In addition, no consideration is made for the interference that occurs between the embroidery frame and the presser foot.

As described above, the bottom of the L-shaped portion of the presser foot and the rear inner periphery of the embroidery frame interfere with each other when the embroidery frame is moved close to the presser rod with respect to an object cloth set on the embroidery frame. Sometimes, therefore, embroidering is disabled partially in the inner periphery outline of the embroidery frame. This is why an invalid area of about 2 to 3 cm in width is generated around the inner rear portion of the embroidery frame. Embroidering is disabled completely in the invalid area. The net embroidering area in which embroidering is enabled, without interference between the presser foot and the embroidery frame, thus becomes narrower than the inner peripheral outline of the embroidery frame.

Like the conventional embroidering machine, a design may not be embroidered just as edited due to the interference between the embroidery frame and the presser foot even when the design is edited so as to be fit in the embroidery frame on a screen on which both design and embroidery frame (or shape) are displayed.

To avoid such a problem, therefore, it is necessary to move the embroidery frame according to the embroidery data used for the actual embroidering, thereby to check for the existence of interference between the embroidery frame and the presser foot. If any interference is found, the design must be edited again or the starting point for embroidering must be moved to change the position of the design with respect to the embroidery frame. The efficiency and productivity of the embroidering work is thus lowered significantly. And, even when editing a design, it may be necessary to edit the design by intuition to prevent the interference between the embroidery frame and the presser foot. As a result, the efficiency of the editing work is also increased significantly.

SUMMARY OF THE INVENTION

Thus, it is an object of the invention to prevent interference between the embroidery frame and the presser foot, enable the net embroidering area in which the embroidery frame and the presser foot do not interfere with each other to be displayed on a display screen when editing designs, and thereby improve the design editing efficiency.

The sewing machine capable of embroidering according to a first aspect of the invention, provided with a displaying means including a display unit, a sewing means, and a cloth feeding means, can embroider designs according to the design data supplied from a design data storing means that stores data of a plurality of embroidery designs. The sewing machine also includes a means for storing net embroidering area data with respect to the embroidery frame used to set an embroidery cloth and a display controlling means for receiving data of a selected embroidery design and data of the net embroidering area of the embroidery frame, thereby displaying the design and the net embroidery area on a display of the displaying means. The net embroidering area enables embroidering without being disturbed by interference between the embroidery frame and the presser foot.

The sewing machine may be, for example, a dedicated embroidering machine or an electronic sewing machine that is capable of embroidering using a removable cloth feeding device that is, preferably, removably attached to the machine. In some cases, design data includes both design embroidery data and design display data. In other cases, design data includes only design embroidery data and does not include design display data, the design display data is created from embroidery data. The area data storing means stores data of the net embroidering area in which embroidering is enabled without interference between the presser foot and the embroidery frame. When editing an embroidery design, the display controlling means receives selected embroidery design data and net embroidering area data and displays both the embroidery design and the net embroidery area on the display of the displaying means. Consequently, it is easy to edit embroidery designs to fit inside the net embroidering area displayed on the display, thereby preventing the presser foot and the embroidery frame from interfering with each other during embroidering.

The embroidery design data selected may be design data stored in the design data storing means and embroidery design data obtained after the design magnification is adjusted. The number of the embroidery frames may be one. When plural embroidery frames are provided, as with a dedicated embroidering machine, the area data storing means stores area data of the plurality of embroidery frames. In such a case, the display controlling means displays the net embroidering area for only a selected one of the plurality of embroidery frames.

The sewing machine according to a first aspect of the invention, because the area data storing means and the display controlling means are provided and it is possible to display both the net embroidering area and embroidery design on the display of the displaying means so that the embroidery design is edited easily to fit into the net embroidering area in which embroidering is enabled without interference between the presser foot and the embroidery frame, the editing efficiency is improved significantly. In addition, since the presser foot and the embroidery frame do not interfere each other when embroidering, it is no need to check whether embroidering is actually possible according to the embroidery data just before the embroidering begins. The efficiency and productivity of the embroidering work is therefore improved significantly.

The sewing machine according to a second aspect of the invention is the same as first aspect of the invention except that the area data storing means also stores the outline of the embroidery frame and the display controlling means can also display the outline of the embroidery frame when both the embroidery design and the net embroidery area are displayed. As the outline of the embroidery area is displayed together with both the embroidery design and the net embroidering area, it is possible to specify the embroidery frame easily and know the positional relationship between the embroidery cloth and the embroidery design roughly.

The sewing machine according to the second aspect of the invention, because the outline of the embroidery frame is displayed together with both the embroidery design and the net embroidering area, makes it possible to specify the embroidery frame easily and know the positional relationship between embroidery cloth and embroidery design roughly, to thereby obtain the same affect as the first aspect of the invention.

The embroiderable sewing machine according to a third aspect of the invention, is provided with a displaying means including a display unit, a sewing means, and a cloth feeding means, so it can embroider designs according to the design data supplied from a design data storing means that stores data of a plurality of embroidery designs. The embroiderable sewing machine also includes a means for storing at least the inner peripheral outline of the embroidery frame used to set the embroidery cloth; a means for computing the net embroidering area in which embroidering is enabled without interference between the presser foot and the embroidery frame, using the inner peripheral outline data of the embroidery frame; and a display controlling means for receiving selected embroidery design data and embroidery frame net embroidering area data, to thereby display the embroidery design and the net embroidering area data on the display of the displaying means.

The sewing machine, design data, and one or a plurality of embroidery frames are the same as the first aspect of the invention. The embroidery frame data storing means according to the third aspect of the invention stores at least inner peripheral outline data of the embroidery frame and the area computing means computes the area data of the net embroidering area in which the presser foot and the embroidery frame do not interfere with each other when embroidering. The displaying means receives selected embroidery design data and embroidery frame net embroidering area data, to thereby display both the embroidery design and the net embroidering area on the display screen of the displaying means. Consequently, just like the first aspect of the invention, it is possible to easily edit the embroidery design so as to fit within the net embroidering area displayed on the screen and perform the embroidering without being disturbed by interference between the presser foot and the embroidery frame.

According to the sewing machine according to the third aspect of the invention, because an embroidery frame data storing means, an area computing means, and a display controlling means are provided, so that the net embroidering area in which the presser foot and the embroidery frame do not interfere with each other when embroidering is displayed together with an embroidery design on the display of the displaying means, it is possible to obtain the same effect as the first aspect of the invention.

The embroiderable sewing machine according to a fourth aspect of the invention is the same as the third aspect of the invention except that the embroidery frame data storing means also stores the data of the embroidery frame outline and the display controlling means can also display the outline of the embroidery frame together with both the embroidery design and the net embroidering area. Thus, it is possible to obtain the same effect as the second aspect of the invention.

According to the sewing machine according to the fourth aspect of the invention, because the outline of the embroidery frame is also displayed together with both the embroidery design and the net embroidering area, it is possible to obtain the same effect as the second aspect of the invention. Other items have the same functions as the third aspect of the invention.

The embroidery data processing apparatus according to a fifth aspect of the invention, provided with a displaying means including a display unit and used to process embroidery design data supplied from a design data storing means that stores data of a plurality of embroidery designs, includes a means for storing the data of a net embroidering area in which the presser foot and the embroidery frame used to set an embroidery cloth do not interfere each other when in sewing with respect to the embroidery frame; and a means for receiving selected embroidery design data and embroidery frame net sewing area data, to thereby control the display of both data on the display of the displaying means.

The fifth aspect does not relate to a sewing machine per se, but relates to an embroidery data processing apparatus.

As the characteristics of the invention are the same as the first aspect of the invention, the invention can have the same functions as the first aspect of the invention. Other items including embroidery design data and one or more embroidery frames are the same as the first aspect of the invention.

The embroidery data processing apparatus according to the fifth aspect of the invention, because an area data storing means and a display controlling means are provided and both the net embroidering area, in which the presser foot and the embroidery frame do not interfere each other when embroidering, and the embroidery design can be displayed on a display of the displaying means, it is possible to obtain the same effect as the first aspect of the invention.

The embroidery data processing apparatus according to a sixth aspect of the invention is the same as the fifth aspect of the invention except that the area data storing means also stores the data of the embroidery frame outline and the display controlling means can also display the outline of the embroidery frame together with both the embroidery design and the net embroidering area. As the outline of the embroidery frame is displayed together with both the embroidery design and the net embroidering area, the positional relationship between embroidery cloth and embroidery design is easily observed.

The embroidery data processing apparatus according to the sixth aspect of the invention, because the outline of the embroidery frame is displayed together with both the embroidery design and the net embroidering area, it is easy to identify the embroidery frame and observe the positional relationship between the embroidery cloth and the embroidery design. Thus, it is possible to obtain the same effect as the fifth aspect of the invention.

The embroidery data processing apparatus according to a seventh aspect of the invention, provided with a displaying means including a display unit and used to process design data supplied from a design data storing means that stores data of a plurality of embroidery designs, also includes a means for storing at least the inner peripheral outline of the embroidery frame used to set an embroidery cloth; a means for computing the net embroidering area in which the presser foot and the embroidery frame do not interfere with each other when embroidering, using the data of the inner peripheral outline of the embroidery frame; and a means for receiving selected embroidery design data and the embroidery frame net embroidering area data, to thereby control the display of the embroidery design and the net embroidering area on the display screen of the displaying means.

The invention is not limited to sewing machines capable of embroidering, but includes any embroidery data processing apparatus. As the characteristics of the invention are as same as the third aspect of the invention, the invention can function in the same way as the third aspect. Other items including embroidery design data and one or more embroidery frames are the same as the first aspect of the invention.

The embroidery data processing apparatus according to the seventh aspect of the invention, because an embroidery data storing means, an area computing means, and a display controlling means are provided and both the net embroidering area, in which the presser foot and the embroidery frame do not interfere each other when embroidering, and the embroidery design can be displayed on the display of the displaying means, it is possible to obtain the same effect as the third aspect of the invention.

The embroidery data processing apparatus according to an eighth aspect of the invention is the same as the seventh aspect of the invention except that the embroidery frame data storing means also stores the data of the embroidery frame outline and the display controlling means can also display the outline of the embroidery frame together with both the embroidery design and the net embroidering area. As the outline of the embroidery frame is displayed together with both the embroidery design and the net embroidering area, it is easy to identify the embroidery frame and know the positional relationship between embroidery cloth and embroidery design.

The embroidery data processing apparatus according to the eighth aspect of the invention, because the outline of the embroidery frame is displayed together with both the embroidery design and the net embroidering area, it is easy to identify an embroidery frame and know the positional relationship between the embroidery cloth and the embroidery design. Thus, it is possible to obtain the same effect as the seventh aspect of the invention.

A design recording medium according to a ninth aspect of the invention stores data of a plurality of embroidery designs. The design data recording medium also stores the data of the net embroidering area in which the presser foot and the embroidery frame used to set an embroidery cloth do not interfere each other when embroidering. The design data recording medium is usable for an embroiderable sewing machine or an embroidery data processing apparatus. Items of design data and one or more embroidery frames are the same as the first aspect of the invention. Since the design data recording medium stores the data of the net embroidering area in which the presser foot and the embroidery frame do not interfere each other when embroidering, the net embroidering area can be displayed on the display of the displaying means using the data of the net embroidering area when editing of a design in the sewing machine or embroidery data processing apparatus.

The design data recording medium according to the ninth aspect of the invention, the recording medium, which stores data of a plurality of embroidery designs, also stores data of the net embroidering area in which the presser foot and the embroidery frame used to set an embroidery cloth do not interfere each other when embroidering, it is possible to display the net embroidering area on the display of the displaying means using the data of the net embroidering area when editing a design in a sewing machine or an embroidery data processing apparatus. Consequently, it is possible to improve the efficiency of the design editing work and the embroidering work significantly.

The design data recording medium according to a tenth aspect of the invention, which stores data of a plurality of embroidery designs, also stores at least the data of the inner peripheral outline of the embroidery frame used to set an embroidery cloth and a program for computing the data of the net embroidering area in which the presser foot and the embroidery frame used to set the embroidery cloth do not interfere with each other when embroidering, using the data of the inner peripheral outline of the embroidery frame.

The design data recording medium is used for an embroiderable sewing machine and an embroidery data processing apparatus. Items of design data and one or more embroidery frames are the same as the first aspect of the invention. As the design data recording medium stores the data of the inner peripheral outline of the embroidery frame used to set the embroidery cloth and a program for computing the data of the net embroidering area in which the presser foot and the embroidery frame used to set the embroidery cloth do not interfere each other when embroidering, it is possible to mount the design data recording medium in a sewing machine capable of embroidering, and an embroidery data processing apparatus, to thereby compute the data of the net embroidering area in which embroidering is enabled without interference between the embroidery frame and the presser foot, using the inner peripheral outline data of the embroidery frame and the area computing program. Thus, it is also possible to display the data of the net embroidering area on the display of the displaying means using the data of the net embroidering area when editing a design in the sewing machine or embroidery data processing apparatus.

The design data recording medium according to the tenth aspect of the invention, which stores data of a plurality of embroidery designs, because the recording medium also stores at least data of the inner peripheral outline of the embroidery frame used to set an embroidery cloth, as well as a program for computing the data of the net embroidering area in which the presser foot and the embroidery frame do not interfere with each other when embroidering, using the inner peripheral outline data of the embroidery frame, it is possible to mount the design data recording medium in an embroiderable sewing machine or an embroidery data processing apparatus, and compute the data of the net embroidering area. It is also possible to display the net embroidering area on the display of the displaying means using the inner peripheral outline data of the embroidery frame and the area computing program.

Consequently, it is possible to improve the efficiency of the design editing work and the embroidering work significantly.

BRIEF DESCRIPTION OF THE DRAWINGS

A preferred embodiment of the invention will be described in detail with reference to the following figures wherein:

FIG. 5 illustrates a structure of the design data;

FIG. 6 illustrates a structure of the embroidery frame data;

DETAILED DESCRIPTION OF PREFERRED EMBODIMENTS

Hereunder, the preferred embodiment of the invention will be described with reference to the accompanying drawings.

Figure 1:
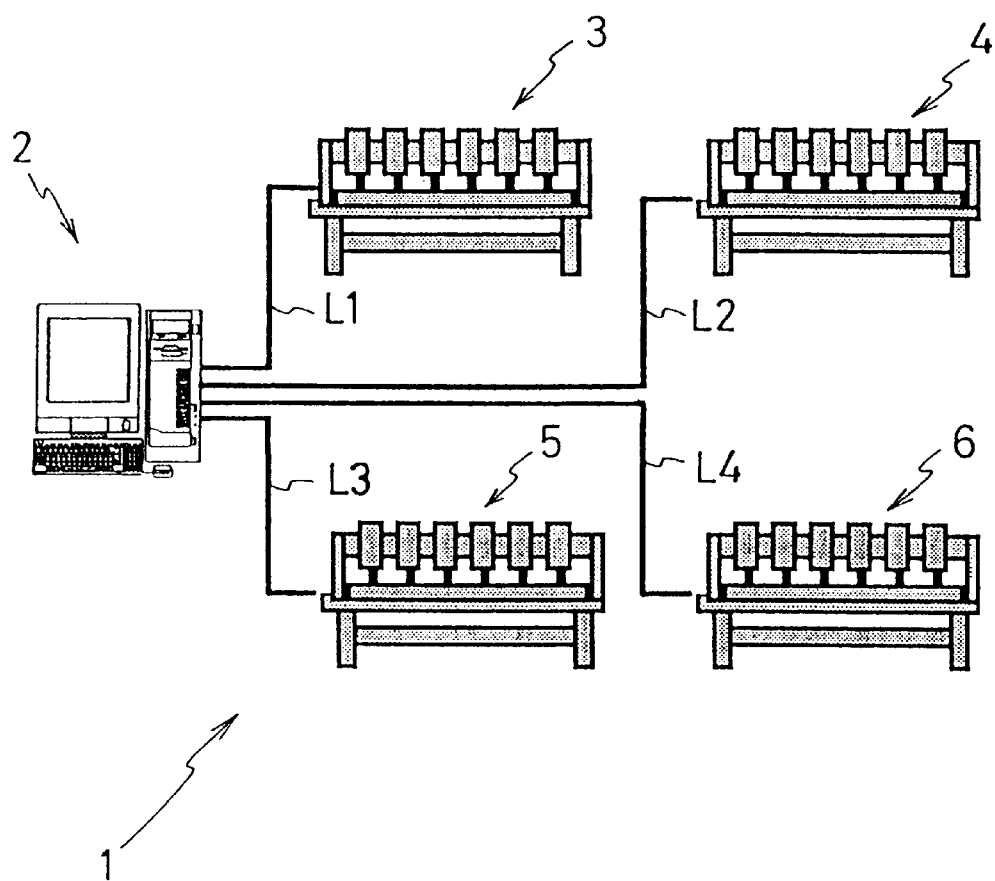
FIG. 1 is a configuration of a sewing system in an embodiment of the invention.

In the embodiment, a sewing machine is connected to four embroidering units used for embroidering various designs on a cloth held by a cloth holding frame according to embroidery data received from an external control system, such as a computer. As shown in FIG. 1, the sewing machine 1 comprises a control system (which will be called a computer in future references) 2; four embroidering units 3 to 6 (each embroidering unit is equivalent to an embroidering machine) connected to the sewing machine (or control system) via one of the dedicated connecting lines L1 to L4 respectively. Each of the embroidering units 3 to 6 is disposed in parallel as a 6-unit machine, so that the 6-unit machine can embroider the same design on each of the 6 cloths held by six embroidery frames mounted in a movable frame (not illustrated) respectively.

Figure 2:
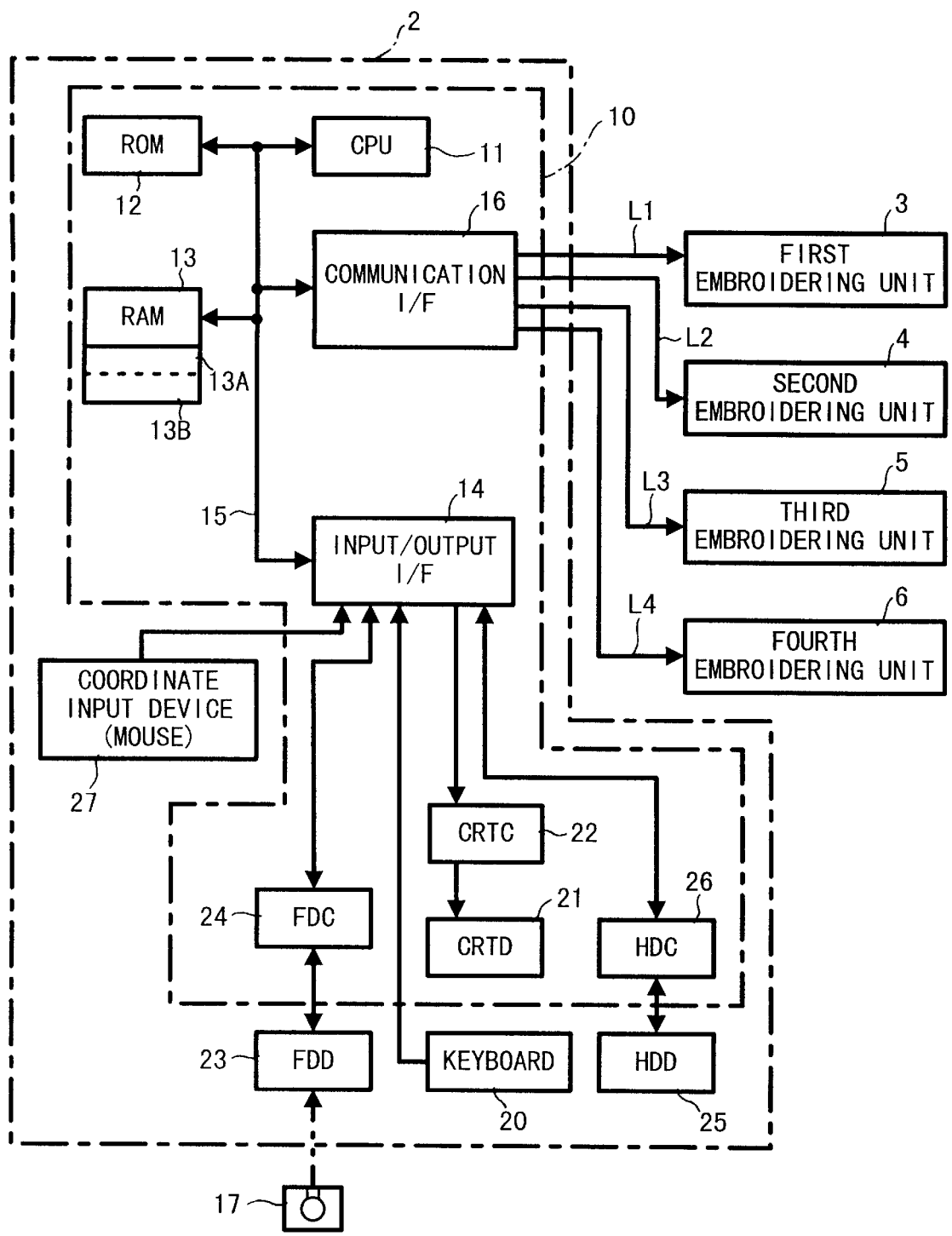
FIG. 2 is a block diagram of a control system.

Hereunder, the control system 2 will be described with reference to the block diagram shown in FIG. 2. A host controller 10 includes a CPU 11; a ROM 12 and a RAM 13 connected to the CPU 11 via a bus 15, such as a data bus, respectively; an input/output interface 14; a communication interface (communication I/F) 16 connected to each of the first to fourth embroidering units 3 to 6; a CRT controller (CRTC) 22 used to output display data to a CRT display (CRTD) 21; a floppy disk controller (FDC) 24 used to drive and control a floppy disk drive (FDD) 23; and a hard disk controller (HDC) 26 used to drive and control a hard disk drive (HDD) 25. The CRT controller 22, the floppy disk controller 24, and the hard disk controller 26 are connected to the input/output interface 14 respectively.

The communication I/F 16 is composed of a Centronics interface, or similar interface, and used for bidirectional data communications. The input/output I/F 14 is connected to a keyboard 20 for entering characters, symbols, and other instructions and a coordinate input device (such as a mouse or joystick) 27 respectively. The ROM 12 stores a start-up program for the control system 2, which is started up when the ROM 12 is powered on.

The hard disk mounted in the HDD 25 stores various operating systems, such as MS-DOS® and Windows®, as well as communication control programs used to transmit/receive data from/to external terminal devices (the four embroidering units 3 to 6 in this case), and various application programs, such as word processors and image creating software, executable in the sewing system as needed. The hard disk also stores various control programs (used to control selection of designs, editing of designs, and displaying of data for editing, for example).

A floppy disk 17 (equivalent to a design data recording medium), loaded removably in the floppy disk drive (FDD) 23, stores data of many embroidery designs classified into groups of design types, as shown in FIG. 5, as well as data for a plurality of embroidery frames, as shown in FIG. 6.

As shown in FIG. 5, each embroidery design data includes design display data used to display embroidery designs on the display 21 and embroidery data used to set needle positions when embroidering. In the start area of the floppy disk 17 are stored the start address data of the design display data and the start address data of the embroidery data for every embroidery design found on the disk 17. In the (second) area following the start area is stored data of the embroidery designs classified into groups. In the (third) area following the second area is stored embroidery data of the embroidery designs classified into groups.

Figure 9:
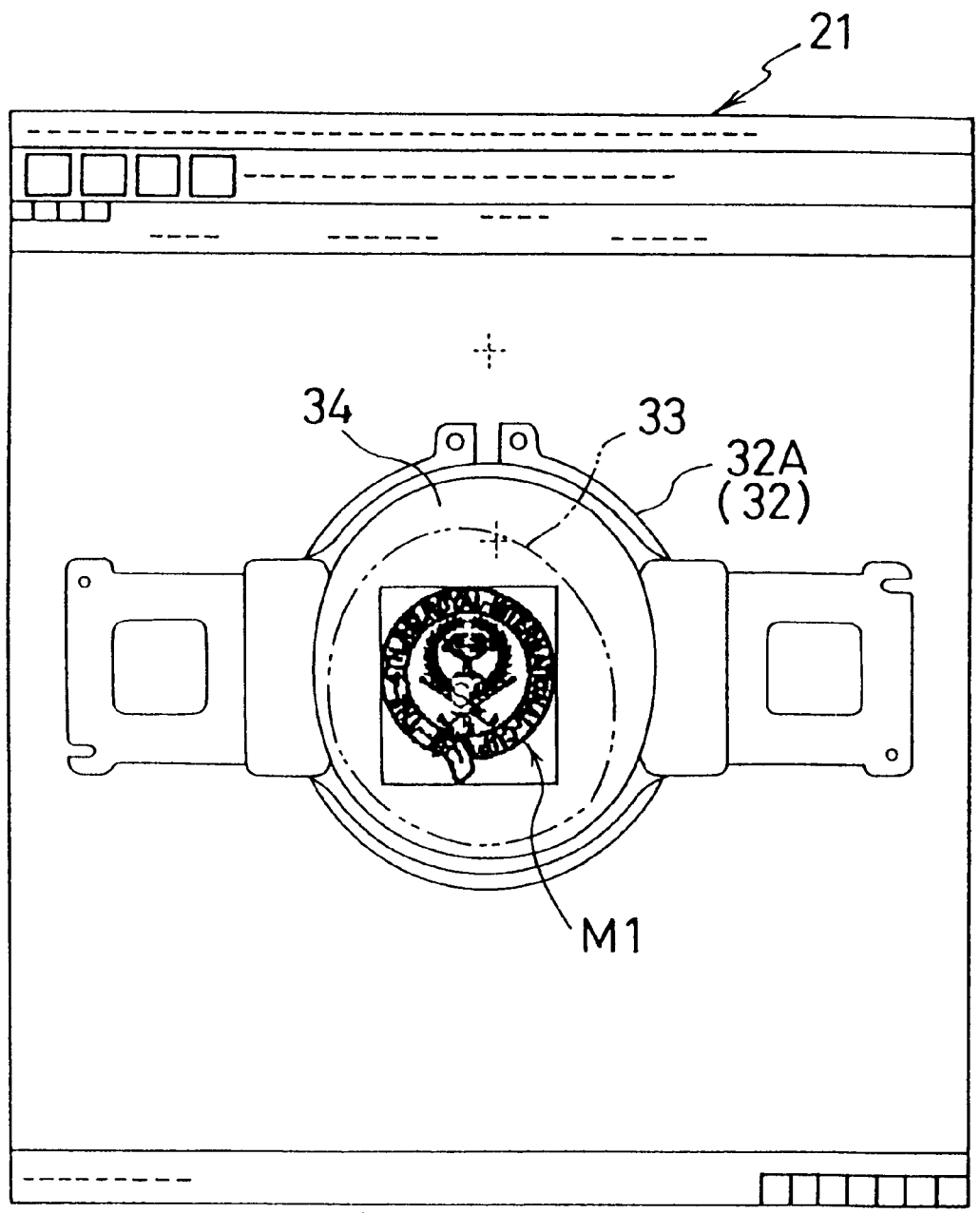
FIG. 9 is an example of displaying data on a display unit.
Figure 10:
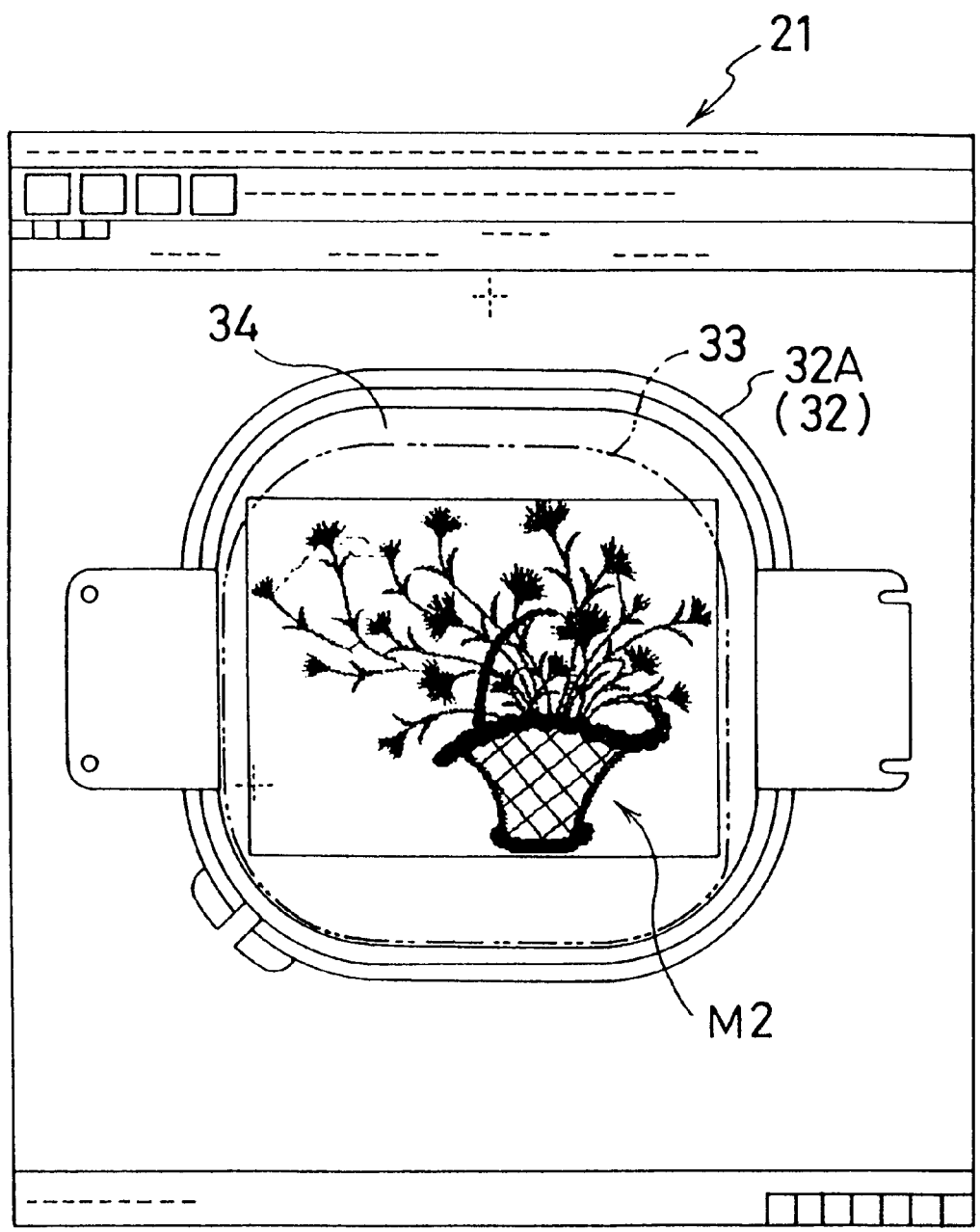
FIG. 10 is another example of displaying data on a display unit.

As shown in FIG. 6, each embroidery frame data includes embroidery frame outline data used to display the outline of the embroidery frame on the display 21, as shown in FIGS. 9 and 10, as well as net embroidering area data (equivalent to area data) used to display the net embroidering area 33, in which the embroidery frame 32 and the presser foot do not interfere each other when embroidering, on the display 21.

The RAM 13 is provided with a data memory 13a for storing various transmit data, such as embroidery data, a work memory 13b, and other memories as necessary. In part of the work memory 13b is stored ID No. data dedicated to the embroidering units 3 to 6, transmitted from the first to fourth embroidering units 3 to 6. The RAM 13 is backed up by a battery so that stored data is retained in a power off situation.

The first to fourth embroidering units 3 to 6 are the same in structure and function. The controller (not shown) used for embroidering units 3 to 6 comprises a microcomputer, an input/output interface, and a communication interface connected to the control system 2. The input/output interface of each embroidering unit is connected to a driving circuit for an X direction driving motor used to move the embroidery frames of that embroidery unit in the X direction (right-left), a driving circuit for a Y direction driving motor used to move the embroidery frames in the Y direction (front-rear), a driving circuit for a machine motor used to drive the six sewing machines in common, and an operation panel provided with a small display unit, indicator lamps, and various switches respectively.

Figure 3:
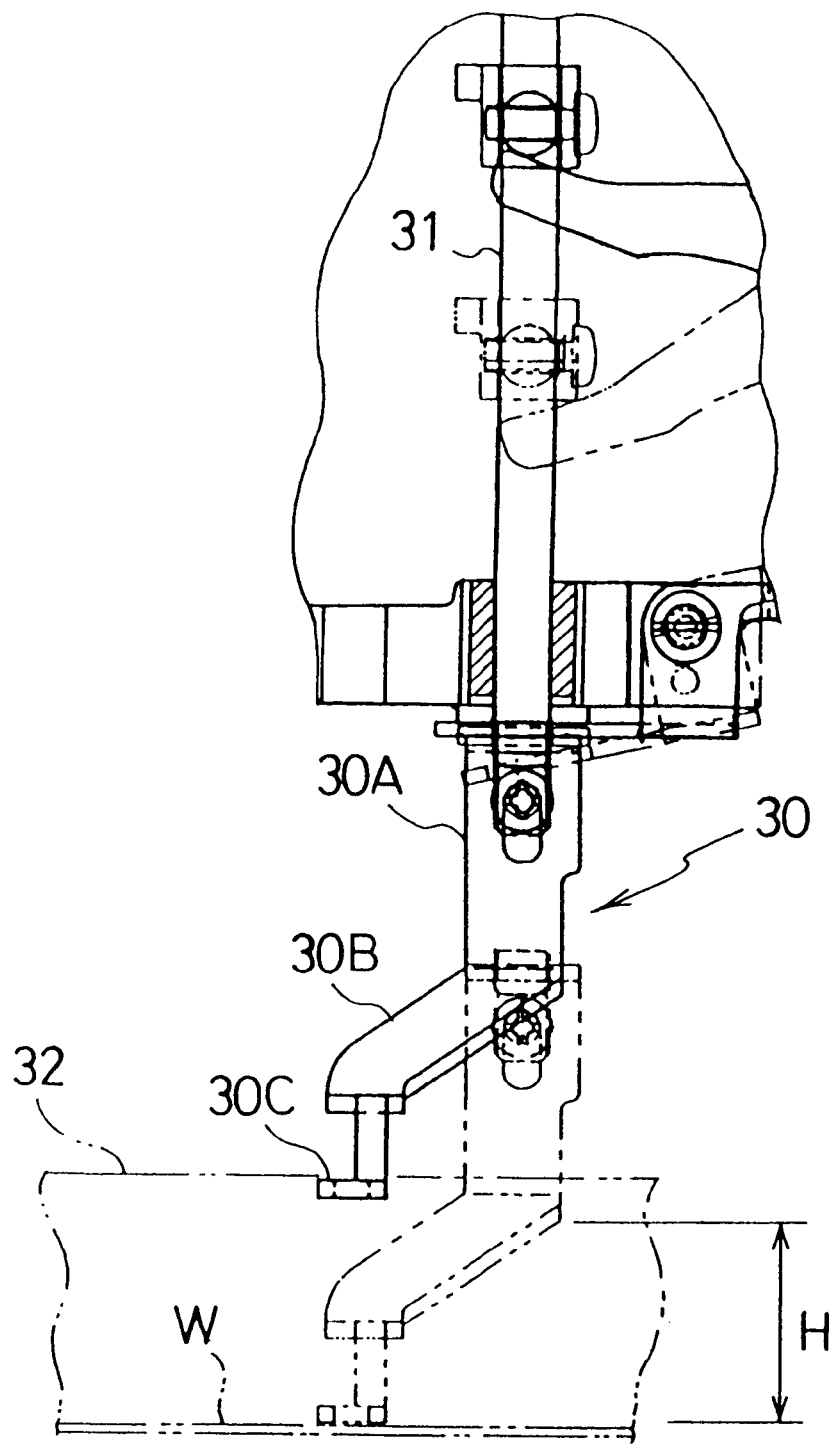
FIG. 3 is a front view of the major portion of a presser foot and a presser rod.
Figure 4:
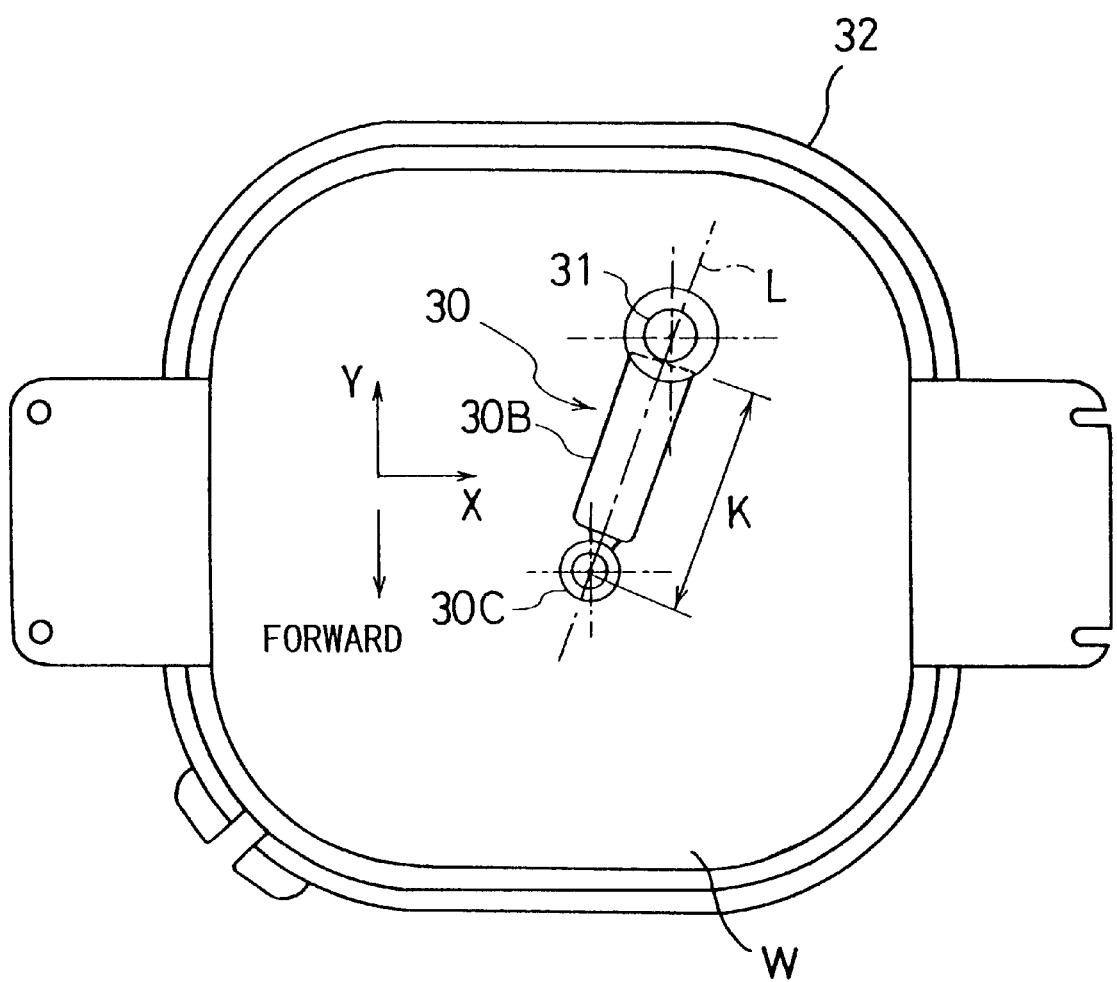
FIG. 4 is a top view of the major portion of the presser foot and the presser rod.

FIG. 3 is a front view of the major portion of the presser foot 30 and the presser rod 31 of each of the embroidering units 3 to 6. FIG. 4 is a top view of the major portion of the presser foot 30 and the presser rod 31. The presser foot 30 includes a perpendicular portion 30a extended downward from the lower end of the presser rod 31; an extruded portion 30b extended forward from the lower end of the perpendicular portion 30a so as to be inclined to the left and downward slightly; and a ring-like cloth holding portion 30c formed at a stepped-down portion at the front end of the protruded portion 30b so as to pass a needle (not illustrated) therethrough. The portions 30a, 30b, 30c are formed unitarily. When embroidering, the presser rod 31 goes down and the cloth holding portion 30c holds a cloth W.

The embroidery frame 32 used to attach an embroidery cloth holds the cloth W by putting the outer periphery of the cloth W between an outer frame and an inner frame of the embroidery frame 32. The embroidery frame 32 protrudes upwardly from the cloth W and the ordinary embroidery frame 32 is larger in the vertical dimension than the size H shown in FIG. 3. When the embroidery frame 32 moves forward and close to the presser foot 30 during embroidering, the rear portion of the embroidery frame 32 and the presser foot 30 interfere with each other, disabling embroidering.

In the sewing system 1 of the invention, when the control system 2 is used to edit an object embroidery design, the net embroidering area 33 in which the embroidery frame 32 and the presser foot 30 do not interfere with each other during embroidering is displayed on the display 21, so that the embroidery design can be edited to fit within the net embroidering area 33.

Figure 7:
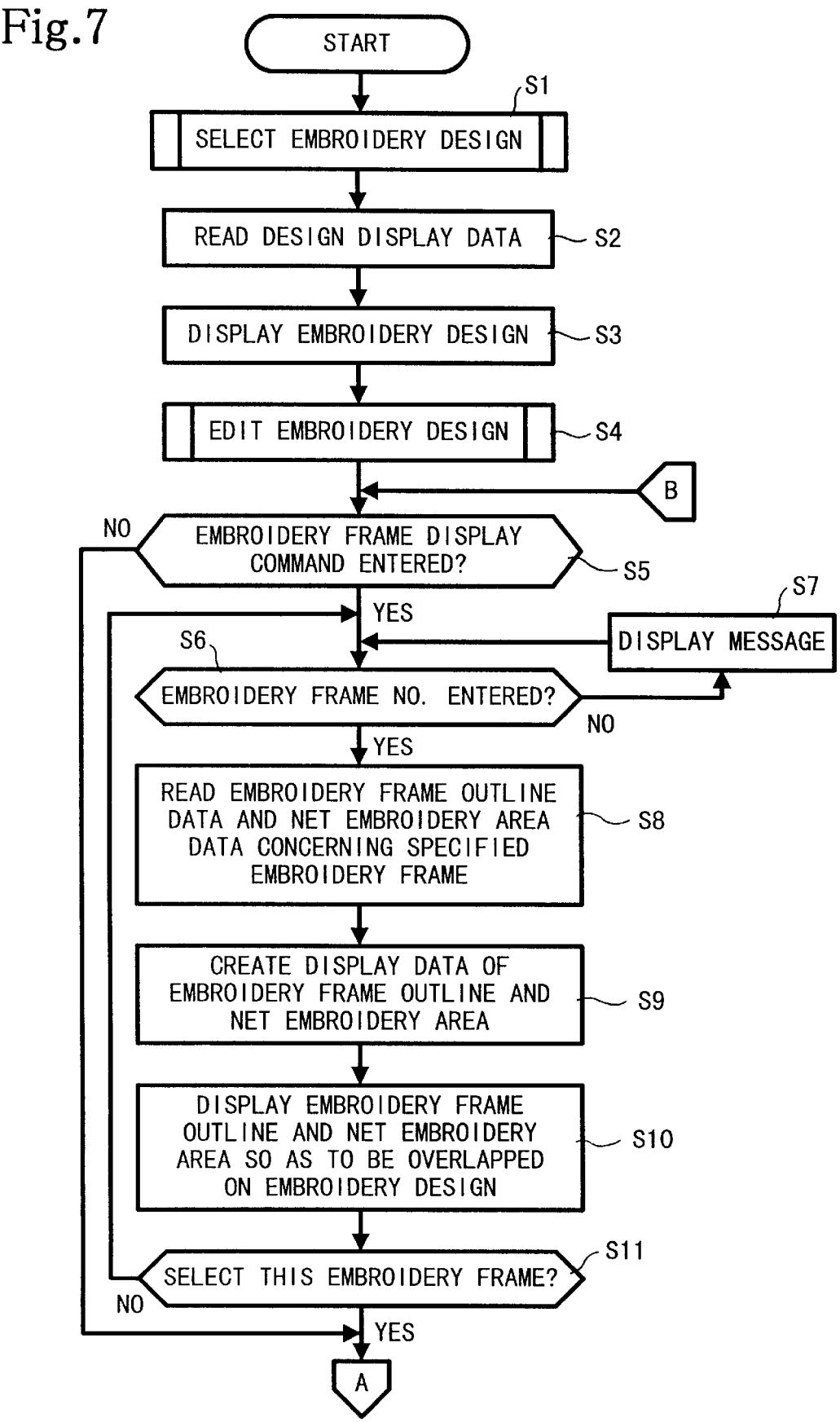
FIG. 7 is part of a flow chart for a display control routine for editing.
Figure 8:
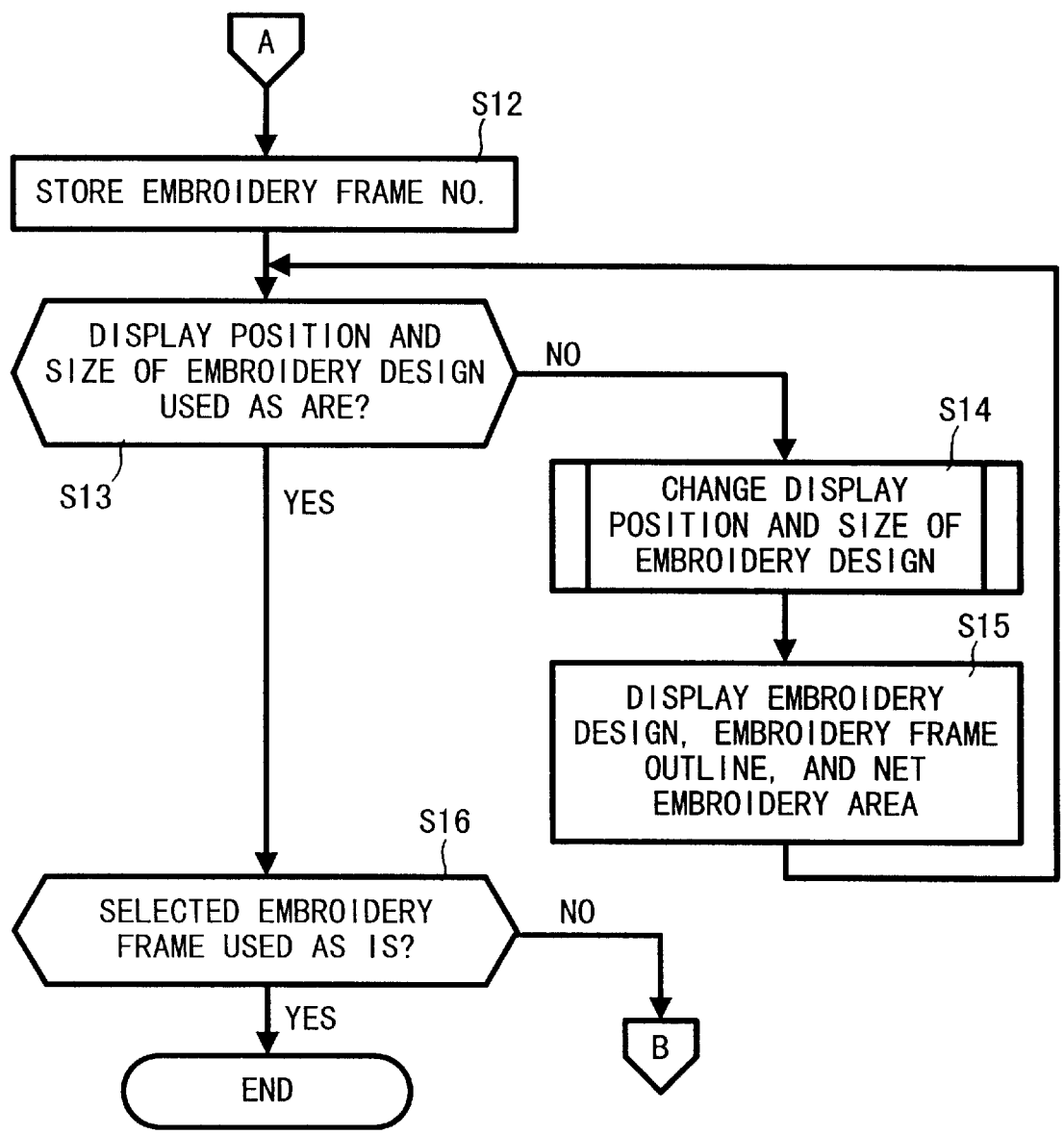
FIG. 8 is the remaining portion of the flow chart for the display control routine for editing.

Next, control of the display of embroidery designs for editing will be described with reference to the flow charts shown in FIGS. 7 and 8. The embroidery design, the embroidery frame, and the net embroidering area are displayed on the display 21 when the design is edited. In FIGS. 7 and 8, Si (i=1, 2,. . .) indicates the step number. When the control begins, at first, an embroidery design is selected in S1. In the design selection, the design selection menu is displayed on the display 21 and a design group is selected. Then, a plurality of embroidery designs of the specified design group are displayed on the screen, from which the desired design is selected.

Next, the selected embroidery design display data is read from the floppy disk 17 (S2) and the embroidery design is displayed on the display 21 (S3). After this, an operation for editing the embroidery design is executed to adjust the size (expansion/shrinkage) and orientation of the embroidery design by checking the design displayed on the display 21 (S4). It is then determined whether an embroidery frame display command is entered using any of the icons and markers displayed on the screen of the display 21 (S5). When YES is selected, it is then determined whether an embroidery frame number is entered (S6). When NO is selected, a prompt message is displayed on the screen to prompt the operator to enter an embroidery frame number (S7) and control returns to S6.

When an embroidery frame number is entered, both the embroidery frame outline data and the net embroidering area data of the specified embroidery frame are read from the floppy disk 17 (S8). The embroidery frame outline data and the net embroidering area data are used to display both the embroidery frame and the net embroidering area on the display 21 at a specified shrinkage rate for each embroidery frame. Both data are already described in the specified compression format of the memory capacity. These data may also be described as dot image data that is not compressed.

Next, display data (dot image data) is created from the embroidery frame data and the net embroidering area data read in S8 (S9). The display data is used to display the embroidery frame outline 32A and the net embroidering area 33. After this, as shown in FIGS. 9 and 10, the embroidery frame outline 32A and the net embroidering area 33 are displayed so as to be overlapped on the exemplary embroidery designs m1 (FIG. 9) and m2 (FIG. 10) on the screen of the display 21 (S10). When the interference between the embroidery frame 32 and the presser foot 30 is taken into consideration as described above, an invalid area 34 is generated inside the inner peripheral outline of the embroidery frame 32 as shown in FIGS. 9 and 10. The invalid area 34 is displayed with the net embroidering area 33 enclosed by a two-dot chain line.

Since the rear end of the protruded portion 30b of the presser foot 30 interferes with the rear frame portion and the inner peripheral outline of the right side frame portion of the embroidery frame 32, the invalid area 34 is generated mostly in the rear right half of the embroidery frame 32. The width of the invalid area 34 in the direction of the center line L is equal to the length K, shown in FIG. 4, of the extended portion 30b. In the front left half of the embroidery frame 32 is generated an invalid area 34 whose width is substantially equal to the radius of the holding portion 30c of the presser foot 30. Because the embroidery frame 32 displayed as shown in FIG. 10 is in actuality larger than the actual frame shown in FIG. 9, the frame representation is shrunk at a larger shrinkage rate than the embroidery frame 32 shown in FIG. 9, the width of the invalid area 34 shown in FIG. 10 appears to be reduced but is in fact the same actual size.

Next, it is determined whether the displayed embroidery frame 32 is selected (that is, whether the embroidery frame is to be used) in S 11. When YES is selected, control goes to S12. When NO is selected, control goes to S6 to execute the processing in and after S6. When no embroidery frame is specified in S5, control goes to S12 from S5. In the first iteration after turning the machine on a default embroidery frame is used, on subsequent iterations the last entered embroidery frame is used. If a non-volatile memory is used, then the first iteration after turning the machine on may use the last embroidery frame selected during the last use as the default embroidery frame. In S12, the embroidery frame number of the selected embroidery frame 32 is stored, then it is decided whether the display position and size of the embroidery design are to be used as they are. When NO is selected, a processing is executed to change the display position and size of the embroidery design in S14.

In S15, the embroidery design, such as ml (FIG. 9) and m2 (FIG. 10), after the display position and size are changed, are displayed together with the embroidery frame outline 32A and the net embroidering area 33 on the screen. Then, control returns to S13. When YES is selected in S13, it is determined whether the selected embroidery frame is used as is (S16). When NO is selected, control returns to S5 to execute the processings in and after S5 again. When YES is selected in S16, the display control for editing is ended. When the position, size, and orientation of the embroidery design, such as ml and m2, are decided through the above editing, the embroidering data of the embroidery design read from the floppy disk 17 are processed, thereby to create actual embroidering data. The embroidering data is then stored in the floppy disk 17.

Because the embroidery design, the embroidery frame outline, and the net embroidering area selected on the screen of the display 21 are displayed when editing the embroidery design in the display control for editing, the position, size, and orientation of the embroidery design can be edited easily to fit the embroidery design into the net embroidery area 33 of the selected embroidery frame 32. It is thus possible to improve the efficiency of the editing work. In addition, because highly reliable embroidering data can be created for an actual embroidering work, it is possible to omit a check whether the embroidery frame and the presser foot interfere each other before the actual embroidering begins, thereby improving the efficiency and productivity of the embroidering work.

Next, a description is made for how the above preferred embodiment of the invention can be modified.

1) Instead of the embroidery frame outline data included in the embroidery frame data stored in the floppy disk 17, embroidery frame number data may be stored in advance, then both the embroidery frame number and the net embroidering area may be displayed on the display 21 instead of the embroidery frame outline and the net embroidering area.

2) The embodiment may be modified so that the design display data included in the design data stored in the floppy disk 17 is omitted and only the embroidery data of the plurality of embroidery designs is stored in advance, so that embroidery data is read, thereby creating design data from the embroidery data.

Figure 11:
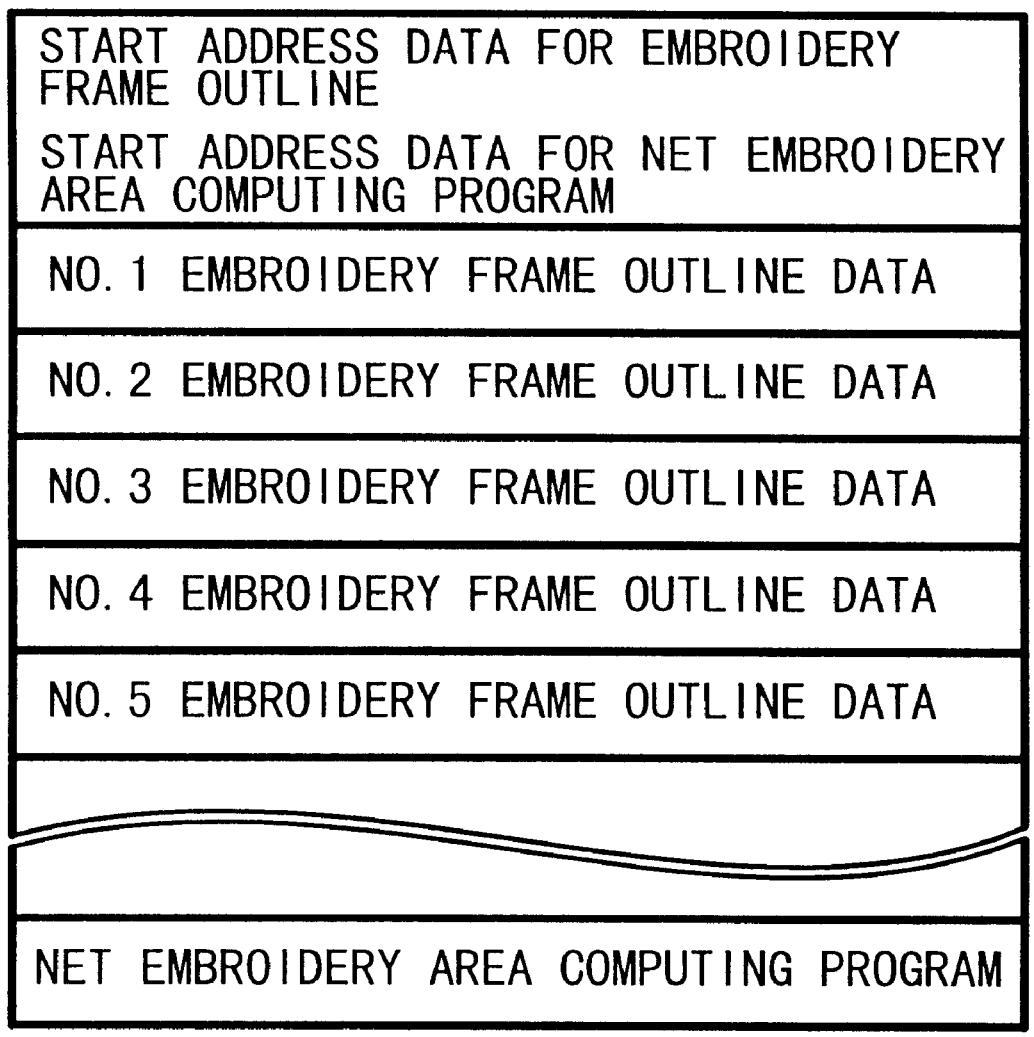
FIG. 11 illustrates an example for changing the structure of embroidery frame data.

3) Instead of storing the net embroidering area data in the floppy disk 17, a net embroidering area computing program may be stored in the floppy disk 17. The program is used to compute the net embroidering area using embroidery frame outline data. In this case, the embroidery frame data stored in the floppy disk 17 will be as shown in FIG. 11. In other words, the data is composed of embroidery frame outline data of a plurality of embroidery frames, a program for computing the net embroidering area 33 using embroidery frame outline data, the start address of the embroidery frame outline data, and the start address of the net embroidering area computing program.

Figure 12:
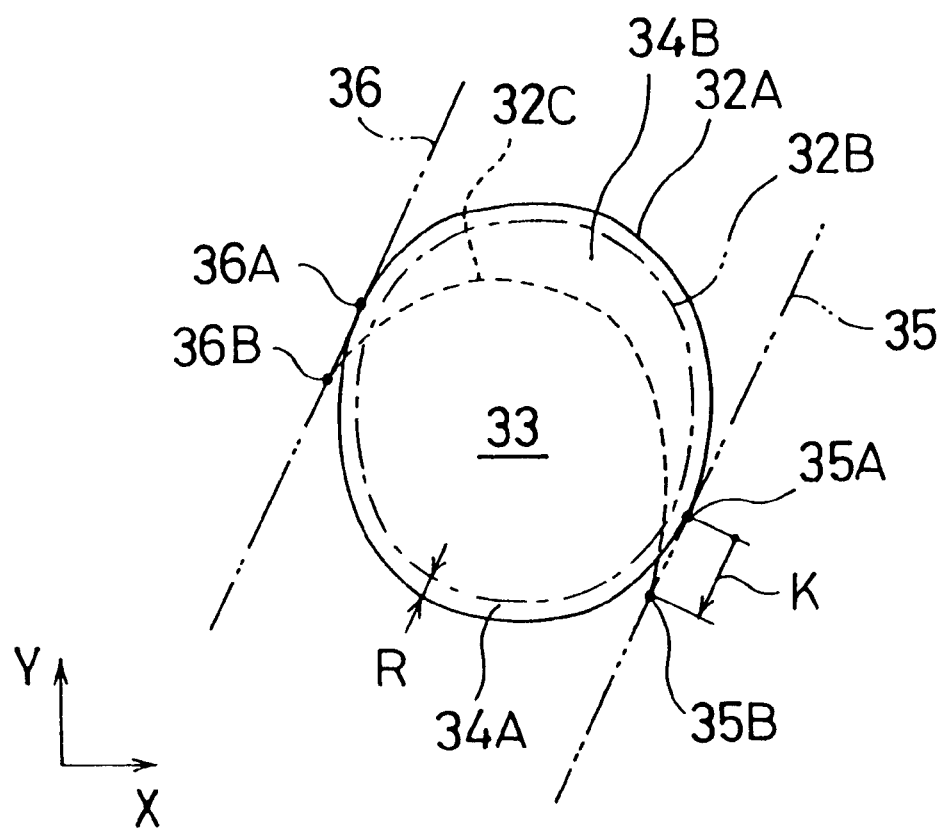
FIG. 12 illustrates a computing logic for the net embroidering area.
Figure 13:
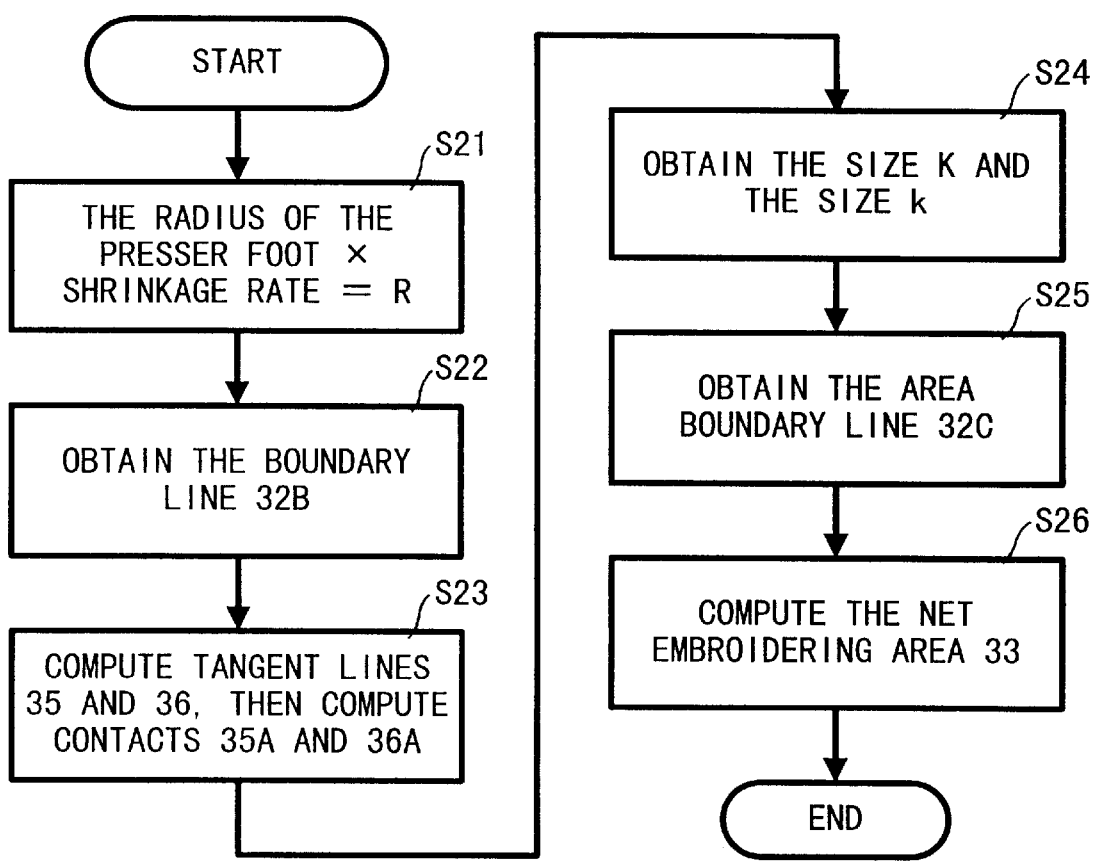
FIG. 13 is a flow chart for a routine for computing a net embroidering area.

Hereunder, a description is provided of the computing logic of the program used for computing the net embroidering area 33 with reference to FIGS. 12 and 13. For example, when the data of the inner peripheral outline 32a of the embroidery frame and the direction data of the center line L of the presser foot 30, shown in FIG. 4, are given, the inner peripheral outline 32a is displayed as an outline shrunk at the specified shrinkage rate. If the radius of the holding portion 30c of the presser foot 30 shrunk at the specified shrinkage rate is assumed to be r, an area boundary line 32b is found and displayed (S21,S22). The boundary line 32b is obtained by shrinking itself by a distance r inward of the inner peripheral outline 32a. The ringlike area between this area boundary line 32b and the inner peripheral outline 32a is an invalid area 34a in which embroidering is disabled due to the interference between the holding portion 30c and the inner peripheral outline 32a representing the inner surface of the embroidering frame 32.

Then, the invalid area 34b in which embroidering is disabled due to the interference between the rear end of the protrusion 30b of the presser foot 30 and the inner periphery outline 32a is determined. At first, tangent lines 35, 36 parallel to the center line L, shown in FIG. 4, and in contact with the right and left sides of the inner peripheral outline 32a are computed, then the contacts 35a and 36a are computed (S23). A computation is made for the area boundary line 32c (area boundary line between points 35b and 36b) obtained by moving the latter half of the inner peripheral outline 32a between contacts 35a and 36a forward in parallel to the tangent lines 35 and 36 the distance k obtained by shrinking the size K shown in FIG. 4 at the specified shrinkage rate (S24,S25).

The area between the inner peripheral outline 32a and the area boundary line 32c is the invalid area 34b in which embroidering is disabled due to the interference between the rear end of the protrusion 30b of the presser foot 30 and the inner peripheral outline 32a. After this, the area obtained by subtracting the invalid areas 34a and 34b from the area inside the inner peripheral outline 32a is computed as a net embroidering area 33 in which embroidering is enabled without being disturbed by the interference between the presser foot 30 and the inner peripheral outline 32a (S26). The net embroidering area 33 is computed using the embroidery frame outline data with respect to the specified embroidery frame 32, and the embroidery design, the embroidery frame outline 32A, and the net embroidering area 33 are displayed on the display 21.

When outline data of a plurality of embroidery frames and a net embroidering area computing program are stored together with data of many embroidery designs in the floppy disk 17, the storing capacity needed is less than for storing only net embroidering area data. The advantage is obvious.

4) Although the invention is applied to a sewing system 1 in the above embodiment, the invention may also be applied to a dedicated embroidering machine in the same way, as well as a domestic electronic sewing machine that enables embroidering when a cloth feeding device is removably attached to the machine, the attached cloth feeding device capable of feeding cloth in both X and Y directions.

The invention may also be applied to an embroidery data processing apparatus composed of, for example, a personal computer used for creating and editing embroidery design data in the same way.

5) Although the design data recording medium is a floppy disk 17 in the above embodiment, other recording media such as a ROM card, a CD-ROM, a magnetic tape, a hard drive may be used.

6) Furthermore, the above embodiment may also be varied using existing technologies. The invention should not be limited only to the above embodiment.

What is claimed is:

1. A sewing machine, comprising:

a display unit;

a sewing assembly; and a cloth feeding assembly, the sewing machine enabling embroidering according to design data supplied from a medium storing data of a plurality of embroidery designs, wherein the sewing machine further includes:

a data storage medium storing data of a net embroidering area in which embroidering is enabled, so that a presser foot and an embroidery frame of the sewing machine do not interfere with each other, the embroidery frame being used to set an embroidery cloth; and a display controller that receives selected embroidery design data and the net embroidering area data of the embroidery frame to display both embroidery design and net embroidering area on the display unit.

2. The sewing machine as defined in claim 1, wherein the data storage medium stores outline data of the embroidery frame and the display controller controls the display of the outline of the embroidery frame together with the embroidery design and the net embroidering area on the display unit.

3. The sewing machine as defined in claim 1, wherein the data storage medium has the net embroidering area data prestored therein.

4. The sewing machine according to claim 1, wherein the data storage medium stores at least inner peripheral outline data of an embroidery frame used to set an embroidery cloth; and the sewing machine further includes a processor that computes data of the net embroidering area in which embroidering is enabled without interference between a presser foot of the sewing means and the embroidery frame, using the inner peripheral outline data of the embroidery frame.

5. The sewing machine as defined in claim 4, wherein the data storage medium stores complete embroidery frame outline data and the display controller controls the display unit to display the outline of the embroidery frame together with the embroidery design and the net embroidery frame.

6. An apparatus provided with a display system including a display unit and used for processing embroidery design data supplied from a design data storage medium that stores data of a plurality of embroidery designs, wherein the apparatus further includes:

a data storage medium that stores data of a net embroidering area with respect to the embroidery frame used to set an embroidery cloth, the net embroidering area enabling embroidering without interference between a presser foot of a sewing machine and the embroidery frame; and a display controller that receives selected embroidery design data and data of the net embroidering area of the embroidery frame, thereby to display the embroidery design and the net embroidering area on the display unit.

7. The apparatus as defined in claim 6, wherein the data storage medium has the net embroidering area data prestored therein.

8. The apparatus as defined in claim 6, wherein the display controller controls the display unit to display the outline of the embroidery frame together with a selected embroidery design and the net embroidering area.

9. The apparatus as defined in claim 6, wherein the data storage medium stores at least inner peripheral outline data of an embroidery frame used to set an embroidery cloth; and the apparatus further includes a processor that computes area data of a net embroidering area using the embroidery frame inner peripheral outline data, the net embroidering area enabling embroidering without interference between a presser foot and the embroidery frame.

10. The apparatus as defined in claim 9, wherein the data storage medium stores embroidery frame outline data and the display unit also displays an outline of embroidery frame together with the embroidery design and the net embroidering area.

11. A medium for storing data of a plurality of embroidery designs, wherein the storing medium stores area data of a net embroidering area with respect to an embroidery frame used to set an embroidery cloth, the net embroidering area enabling embroidering without interference between a presser foot of a sewing machine and the embroidery frame.

12. The medium for storing data as defined in claim 11, wherein the net embroidering area data is prestored therein.

13. The medium for storing data as defined in claim 11, wherein the medium stores at least inner peripheral outline data and a program for computing area data of net embroidering area, with respect to an embroidery frame used to set an embroidery cloth, using embroidery frame inner peripheral outline data and the net embroidering area to enable embroidering without interference between a presser foot and the embroidery frame.

14. A control system for a sewing system having an embroidery capability, the control system comprising:

a central processing unit that controls the sewing apparatus;

a storage medium storing, at least, embroidery design data for a plurality of embroidery designs and embroidery frame data for a plurality of embroidery frames;

a display unit for displaying selected data; and a selection mechanism allowing selection of an embroidery design from the plurality of embroidery designs and selection of an embroidery frame from the plurality of embroidery frames, wherein the central processing unit creates a display on the display unit showing the selected embroidery design superimposed on a net embroidery area derived from the selected embroidery frame.

15. The control system according to claim 14, further comprising an edit device connected to the central processing unit that permits setting a position of the selected embroidery design within the net embroidery area and permits size adjustment of the selected embroidery design to fit within the net embroidery area on a basis of the position.

16. The control system according to claim 14, wherein the storage medium stores net embroidery area data associated with each embroidery frame of the plurality of embroidery frames.

17. The control system according to claim 14, wherein the central processing unit comprises a processor that calculates the net embroidery area for the selected embroidery frame.

18. The control system according to claim 17, wherein the processor determines the net embroidery area using inner peripheral outline data for the selected embroidery frame and dimension data for a presser foot of the sewing system.

19. A recording medium for storing an embroidery design editing routine, comprising:

a sub-routine directed to selecting an embroidery design from a plurality of embroidery designs;

a sub-routine directed to selecting an embroidery frame from a plurality of embroidery frames;

a sub-routine for obtaining outline data for the selected embroidery frame to include inner peripheral data;

a sub-routine for obtaining embroidery design data for the selected embroidery design;

a sub-routine for determining a net embroidery area within the selected embroidery frame; and a sub-routine for controlling a display unit to display the selected embroidery design superimposed on the net embroidery area.

20. The recording medium according to claim 19, wherein the sub-routine for determining the net embroidery area reads outline data for the net embroidery area from a data file.

21. The recording medium according to claim 19 wherein the sub-routine for determining the net embroidery area has routines for:

reading the inner peripheral data for the selected embroidery frame;

reading data providing dimensions of a presser foot of a sewing machine;

calculating an area within an inner periphery of the selected embroidery frame, as defined by the inner peripheral data, that is sewable with the presser foot; and developing outline data for the sewable area which is designated the net embroidery area.

22. The recording medium according to claim 19, further storing a sub-route for adjusting a size of the selected embroidery design.

23. The recording medium according to claim 22, further storing a sub-routine for adjusting a position of the selected embroidery design within the net embroidery area.

24. A method of editing an embroidery design for use with an embroidery frame of a sewing machine capable of sewing embroidery patterns, comprising the steps of:

selecting an embroidery design from a plurality of embroidery designs;

displaying an embroidery frame;

displaying on a display unit the selected embroidery design superimposed on the embroidery frame;

determining a net embroidery area;

displaying the net embroidery area on the display unit; and editing the selected embroidery design on a basis of one of the displayed embroidery frame and the displayed net embroidery area.

* * * * *